United States Patent
Nagaki et al.

(10) Patent No.: US 6,832,154 B2
(45) Date of Patent: Dec. 14, 2004

(54) NAVIGATION SYSTEM

(75) Inventors: Kouichi Nagaki, Tsurugashima (JP); Tomoo Watanabe, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 09/822,310

(22) Filed: Apr. 2, 2001

(65) Prior Publication Data

US 2001/0029427 A1 Oct. 11, 2001

(30) Foreign Application Priority Data

Mar. 31, 2000  (JP) ..................... P2000-099905

(51) Int. Cl.⁷ .......................... G01C 21/30; G06F 12/00
(52) U.S. Cl. .................... 701/208; 701/25; 342/357.13; 340/995.18; 711/165
(58) Field of Search ............................. 701/1, 35, 200, 701/207, 208, 25; 707/1–2, 101–102, 200–204, 5, 10, 100, 205, 206, 103, 104; 342/357.01, 357.06, 357.12, 357.13; 340/995.1, 995.14, 995.15, 995.18

(56) References Cited

U.S. PATENT DOCUMENTS

| 5,864,861 A | * | 1/1999 | Williams ..................... 455/550 |
| 5,930,828 A | * | 7/1999 | Jensen et al. ................. 360/48 |
| 6,038,636 A | * | 3/2000 | Brown et al. ............... 711/103 |
| 6,073,076 A | * | 6/2000 | Crowley et al. ............ 701/208 |

* cited by examiner

Primary Examiner—Jacques H. Louis-Jacques
(74) Attorney, Agent, or Firm—Sughrue Mion, PLLC

(57) ABSTRACT

A navigation system performing navigation based on a detected current position and map data is provided. The navigation system includes a storage device, a navigation control device, and a defragmenting processing device. The storage device is nonvolatile. Files of map data are able to be read from it, and to be written into it. The navigation control device controls a navigation operation using the map data. Then, the defragmenting processing device performs a defragmenting processing with the storage device at a predetermined time.

41 Claims, 8 Drawing Sheets

NAVIGATION SYSTEM

BACKGROUND OF THE INVENTION

1. Field of the Invention

The present invention relates to a navigation system that navigates using map data recorded in a recording medium, and in particular, to a navigation system equipped with a hard disk that stores the map data.

2. Description of the Related Art

There has been widely known a navigation system, which has a DVD-ROM drive unit or a CD-ROM drive unit, reads out the map data from a DVD-ROM or a CD-ROM as a recording medium to record map data therein to perform tasks of navigation. Differently from those recording mediums, a configuration can be considered, in which a hard disk, which functions as a nonvolatile storing means with a large memory capacity, is mounted in a navigation system. Because the hard disk has a higher access speed compared to mediums such as a DVD-ROM, the hard disk has a great advantage in that objects to be displayed based on map data can be depicted on a monitor screen at a high speed. If map data are transferred from, for example, a DVD-ROM drive to a hard disk in order to navigate, this is advantageous in that the DVD-ROM drive can be made use of other applications, such as music reproduction or image reproduction, even during navigation.

In general, a hard disk uses a filing system in which files corresponding to data to be stored are basically assigned to a continuous empty area and arranged therein. However, when the remaining empty areas of the hard disk are reduced due to the fact that a large number of files have been written, a file that should be stored subsequently is written in the remaining empty areas in such a condition that data are divided into small discontinuous fragments, not written in a single continuous area. When the files of which data are stored in divided areas are read out, an access speed to those files is inevitably lowered.

As a preventive measure against such lowering of the access speed, a defragmenting process has been usually executed in a hard disk. This defragmenting process is to cease such a discontinuously divided condition of a file by transferring a plurality of data fragments of each stored file to a continuously arranged area, thus avoiding such a divided condition. According to user's needs, a software program for the defragmenting process is activated. The defragmenting process permits an access speed to a hard disk to be prevented effectively from being lowered.

However, when executing the defragmenting process in the hard disk mounted in a navigation system, there is a fear that there may occur various types of interference with the performance of the defragmenting process, like cases that an engine stops in the course of execution of the defragmenting process, or reading out map data from the hard disk, becomes necessary, because the navigation is started. It is difficult for users to predict by themselves such occasions of interference before or after starting the defragmenting process, thus being much burden on users. The defragmenting process is no longer done effectively in the hard disk, thus it takes much time to read files of map data. There is a problem that a merit of a hard disk, which is inherently high is access speed, cannot sufficiently be utilized for navigation which should be performed at a higher speed.

SUMMARY OF THE INVENTION

The present invention has been made in consideration of the foregoing problem. An object of the present invention is to provide a navigation system, into which a hard disk is mounted, that is capable of executing a defragmenting process in the hard disk according to its necessity, thereby providing a high-speed access time to realize speedy and agreeable navigation.

The above object of the present invention can be achieved by a navigation system performing navigation based on a detected current position and map data in accordance with the present invention. The navigation system is provided with: a storage device such as a hard disk, which is nonvolatile, from and into which files of map data are able to be read and written; a navigation control device for controlling a navigation operation using the map data; and a defragmenting processing device for performing a defragmenting processing with the storage device at a predetermined time.

According to the navigation system of the present invention, the storage device is nonvolatile. Files of map data are able to be read and written from and into the storage device. The navigation control device controls a navigation operation using the map data. Then, the defragmenting processing device performs a defragmenting processing with the storage device at a predetermined time.

Therefore, even when the map data are frequently read and written responsively to the executed navigation, the defragmenting processing enables data arrangement in the storage device to be maintained in a proper state, thus preventing an access speed to the storage device from being lowered in a secure manner.

In one aspect of the navigation system of the present invention, the defragmenting processing device continuously arranges a plurality of data fragments being arranged in a divided form and belonging to the same file.

According to this aspect, when repeatedly writing data into the storage device, data in the storage device are relocated so as to become continuous. As a result, an access speed to the storing means is securely prevented from being lowered.

In another aspect of the navigation system of the present invention, the storage device is a hard disk mounted in a hard disk apparatus.

According to this aspect, the storage device is realized as a hard disk, which is high in memory capacity, versatility, and access speed. In addition, the defragmenting processing, which is effective in repeatedly reading and writing map data, can be executed to maintain its high access speed.

In another aspect of the navigation system of the present invention, the hard disk apparatus has: a head reading and writing information from and into the hard disk; and a providing device for providing a position to which the head is made to retract from a potion on the hard disk. Further, the defragmenting processing device continuously arranges specific data in the vicinity of the retracted position when the defragmenting processing is performed.

According to this aspect, specific data are continuously arranged in the vicinity of a retracted position of the head in executing the defragmenting processing. This configuration permits the defragmenting processing to be done with an access performance of the hard disk considered.

In another aspect of the navigation system of the present invention, the navigation system further includes an operation device with which executing the defragmenting processing in the storage device is able to be ordered. Then, the defragmenting processing device performs the defragmenting processing in response to the instruction of execution from the operation device.

According to this aspect, in cases the defragmenting processing is ordered by the operation device, the defragmenting processing of the storage device is activated. Hence, it is possible to continuously arrange data in the storage device by reflecting a user's will into timing of execution of the defragmenting processing. This is able to maintain a high access speed to the storage device for map data and others, which will lead to an agreeable navigation.

In another aspect of the navigation system of the present invention, the defragmenting processing device interrupts the defragmenting processing if a given condition is fulfilled during executing the defragmenting processing.

According to this aspect, the defragmenting processing device makes it possible to execute the defragmenting processing, while still judging various conditions, such as states of a vehicle and used states of the storage device, so as to interrupt the defragmenting processing if the conditions are met. If something unfavorable happens during the defragmenting processing, accidents such as data damage of the storage device can be prevented.

In another aspect of the navigation system of the present invention, the defragmenting processing device preserves defragmenting progress data indicative of a progress condition of the defragmenting processing if the defragmenting processing under performance is interrupted.

According to this aspect, defragmenting progress data are once preserved, in case that the defragmenting processing is interrupted as described above. This preservation makes it possible that a progress state of the interrupted defragmenting processing can be reviewed later, which will lead to enhanced convenience including a restart of the defragmenting processing which can be ordered freely.

In another aspect of the navigation system of the present invention, the navigation system further includes an engine sensor for detecting an operated state of an engine of a vehicle. Then, the defragmenting processing device not only monitors an output of the engine sensor during executing the defragmenting processing but also interrupts the defragmenting processing in response to a stop of the engine.

According to this aspect, when the defragmenting processing is once started, an output of the engine sensor is monitored, during which time the defragmenting processing is interrupted if a halt of the engine is detected based on the sensor output. It is therefor possible to prevent battery power from being consumed excessively due to the defragmenting processing during the halt of the engine.

In another aspect of the navigation system of the present invention, the defragmenting processing device restarts the defragmenting processing based on the defragment progress data when the engine under halt is started after the defragmenting processing was interrupted.

According to this aspect, in cases the engine is restart after the interruption of the defragmenting processing because of an engine halt, the defragmenting processing is also restarted using the defragmenting progress data preserved as described above. Therefore, even if the engine is halted during the defragmenting processing, it can be possible that the defragmenting processing is successively re-executed with no useless processing.

In another aspect of the navigation system of the present invention, the defragmenting processing device interrupts the defragmenting processing when the navigation is activated during execution of the defragmenting processing.

According to this aspect, if the navigation become activated after the start of defragmenting processing, the defragmenting processing under operation will be interrupted. Thus, an access to the storage device, which is made to read map data, does not cause damage to the data and other inconveniences.

In another aspect of the navigation system of the present invention, the navigation system further includes a readout device for reading out the map data from a recording medium in which the map data are recorded. Then, the navigation control device executes a navigating operation based on the map data read out by the readout means when the navigation is under operation based on the map data stored in the storage device at a time when the execution of the defragmenting processing is ordered by the operation device. Further, the defragmenting processing device executes the defragmenting processing in the recording medium.

According to this aspect, when the defragmenting processing is ordered through a user's operation during a period of navigation, the readout device reads out map date from the recording medium to use the read map data for navigating operations, during which time the defragmenting processing for the storage device are executed. Thus the defragmenting processing can be executed through necessary actions for the processing even if the navigation is under operation.

In another aspect of the navigation system of the present invention, the navigation system further includes: a readout device for reading out the map data from a recording medium in which the map data are recorded; and an ordering device for ordering execution of a navigating operation. Then, the navigation control means includes means for executing a navigating operation based on the map data read out by the readout device when activation of the navigating operation is ordered by the ordering device during the defragmenting processing in the storage device by the defragmenting processing device.

According to this aspect, in cases navigation is activated during the defragmenting processing and a desired recording medium is loaded into the readout device, map data are read out by the readout device to use for controlling navigation. Therefore, without interrupting the defragmenting processing under execution, the navigation can be conducted with efficiency of processing raised.

In another aspect of the navigation system of the present invention, the navigation system further includes: a readout device for reading out the map data from a recording medium in which the map data are recorded; and an ordering device for ordering execution of a navigating operation. Then, the defragmenting processing device interrupts a defragmenting operation when the recording medium is unloaded in the readout means as well as activation of the navigating operation is ordered by the ordering device during the defragmenting processing in the storage device by the defragmenting processing device.

According to this aspect, if navigation is activated during the defragmenting processing, whether or not the defragmenting processing should be interrupted is determined depending on the presence/absence of a desired recording medium. Thus the defragmenting processing is interrupted, so long as the navigation cannot be conducted without using the storage device. This offers a defragmenting processing with safe and efficiency.

In another aspect of the navigation system of the present invention, the navigation control device issues a massage, after the interruption of the defragmenting processing, for urging a user to load the recording medium in which necessary map data are recorded. Then, the defragmenting processing device restarts the defragmenting processing based on the defragmenting progress data at a time when the recording medium is loaded.

According to this aspect, in cases the defragmenting processing is interrupted due to navigation activated during the defragmenting processing as described above, a message is issued to urge a user to insert a recording medium in which necessary map data are recorded. In response to the insertion of the recording medium carried out according to the message, the defragmenting processing is restarted using defragmenting progress data. Therefore, if a necessary recording medium is not inserted at the beginning, a user can insert the recording medium herself or himself. This allows the navigation to be continued and the defragmenting processing to be executed successively.

In another aspect of the navigation system of the present invention, the navigation system further includes: a selective inputting device for enabling a user to selectively input information about either one of the restart and discontinuation of the defragmenting processing, prior to the restart of the interrupted defragmenting processing.

According to this aspect, in the case that it has become possible to restart the defragmenting processing which have been interrupted, the selective inputting device operates, for example, such that it displays a screen for selection. This screen enables a user to select either restarting the defragmenting processing or continuing the interruption of the defragmenting process. Accordingly, in consideration of the necessity for continuing the defragmenting processing, interactions with other processing, and others, it is possible to determine if the defragmenting processing should be restarted or not according to circumstances given a user.

In another aspect of the navigation system of the present invention, the defragmenting processing device is constructed so as to execute the defragmenting processing in cases a vehicle on which the navigation system is mounted is stopped.

According to this navigation system, the defragmenting processing is set to be executed automatically during a period of stop of a vehicle, responsively to operating states of the vehicle. Thus it may not be required to obtain new map date when activating navigation. The defragmenting processing can be done at timings when the storing means are not accessed.

DESCRIPTION OF THE PREFERRED EMBODIMENTS

Referring to the accompanying drawings, preferred embodiments of the present invention will now be described.

Figure 1:
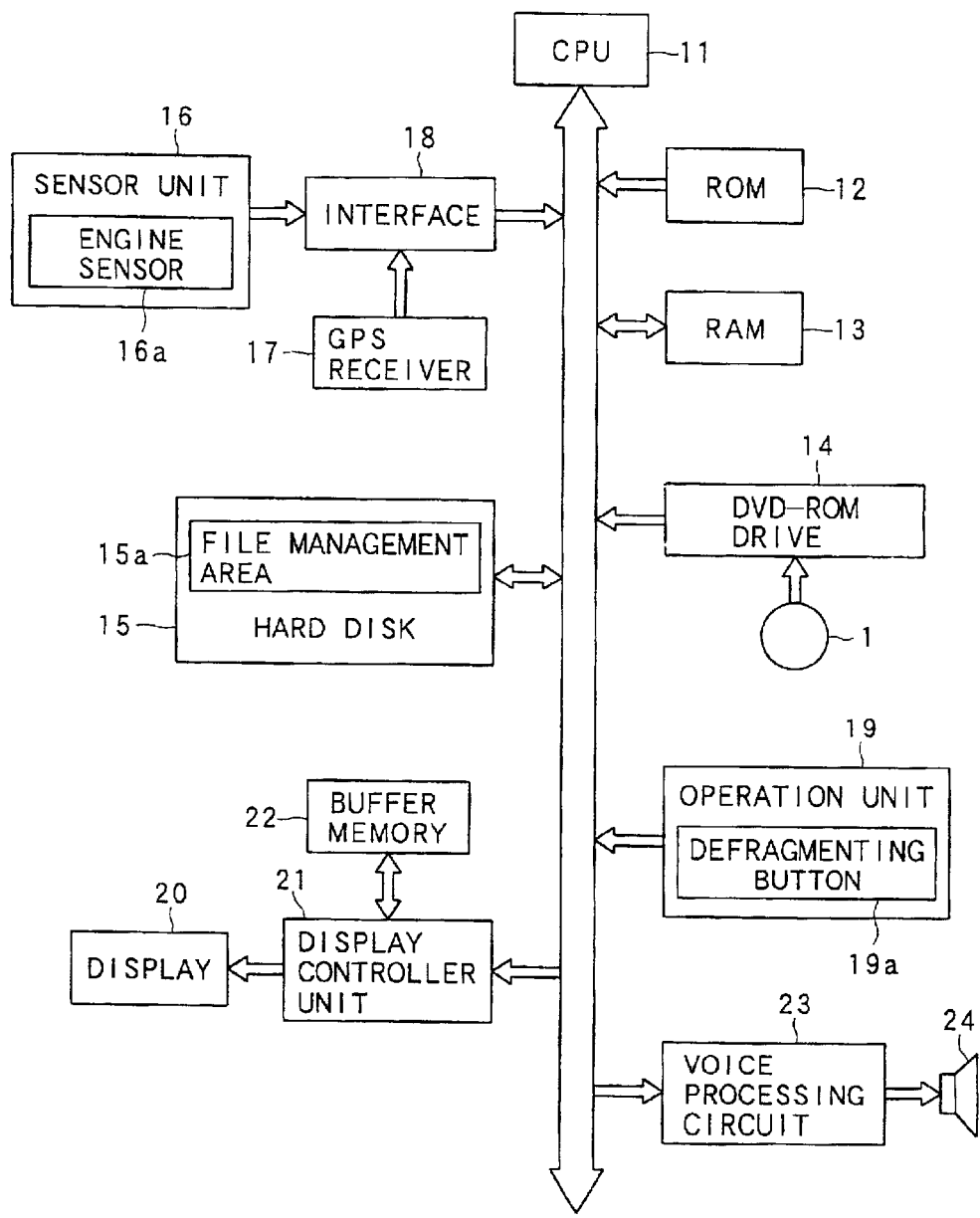
FIG. 1 is a block diagram showing an entire configuration of a navigation system of an invention according to an embodiment.

FIG. 1 shows an entire configuration of a navigation system according to the present embodiment. The navigation system shown in FIG. 1 is equipped with a CPU 11, ROM 12, RAM 13, DVD-ROM drive 14, hard disk 15, sensor unit 16, GPS receiver 17, interface 18, operation unit 19, display 20, display control unit 21, buffer memory 22, voice processing circuit 23, and speaker 24.

In the configuration shown in FIG. 1, the CPU 11 controls the overall operations of the navigation system. The CPU 11, which is electrically connected with each constituent of the navigation system, reads out a control program stored in the ROM 12 to execute the program, and temporarily stores data under processing into the RAM 13. The CPU 11 functions as navigation control means and defragmentation processing means of the present invention.

The DVD-ROM drive 14, which serves as readout means of the present invention, receives the load of the DVD-ROM 1 in which map data are stored, and then reads the map data out therefrom. DVD-ROM 1 is formed into a recording medium with a large memory capacity of 4.7 giga bytes and 8.5 giga-bytes on its mono-layered and double-layered single side, respectively. On the disk of the DVD-ROM 1, pits expressing recorded data are formed. The recorded data are read out by using a pickup of the DVD-ROM drive 14.

In the DVD-ROM 1, map data including data of shapes of roads needed for navigating operations are stored, and moreover, various kinds of related data, such as data of related facilities and related name data, are stored with correspondence to the road shape data. For example, an entire map is divided into blocks which can be treated as a grid-like unit area and a map file is assigned to each block. The entire map data that consist of a large number of map files are recorded in the DVD-ROM 1.

The hard disk 15 is a non-volatile storage responsible for reading and writing various data including map data and functions as storing means of the present invention. The hard disk 15, available for a wide range of applications, is able to store as files various types of data, such as music data, image data, and application programs, and is configured so as to read and write files of those data therefrom and therein.

Figure 2:
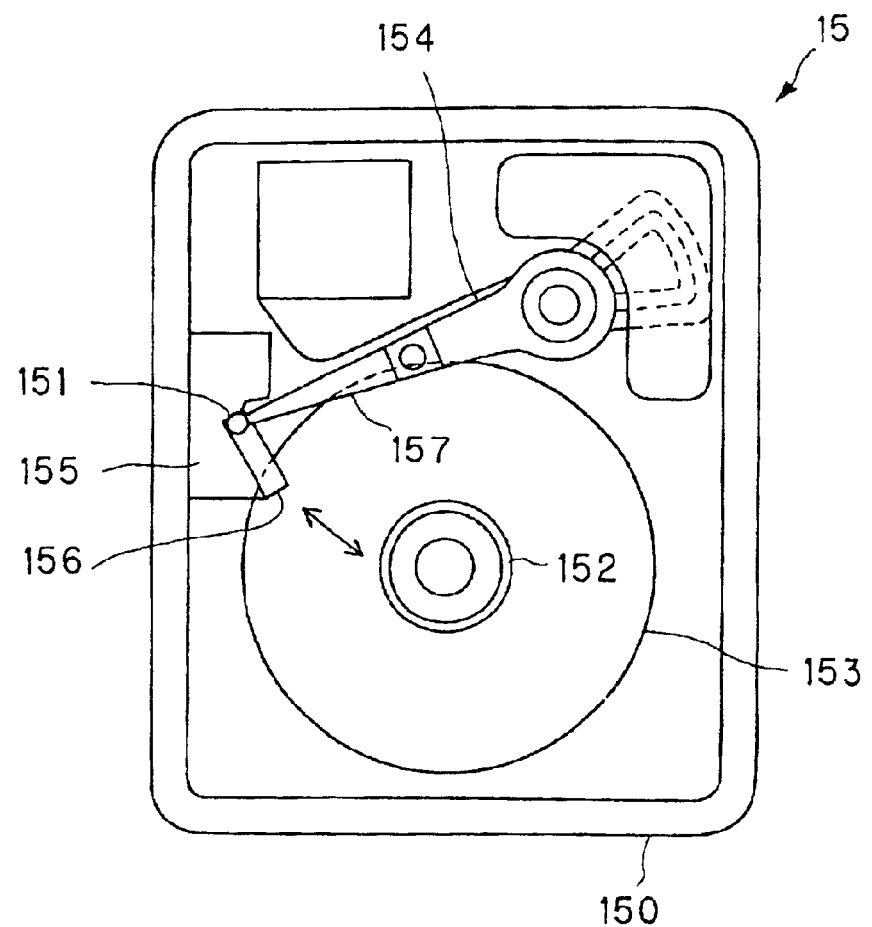
FIG. 2 illustrates the basic structure of a hard disk.

FIG. 2 shows the basic construction of the hard disk 15. This hard disk 15 shown therein is formed into a ramp-loading type of hard disk in which a floating head slider fastened at the tip of an actuator is made to mechanically float above the surface of a magnetic disk.

As shown in FIG. 2, a head 151 is mounted on an actuator 154 in such a way that the head is able to freely move in the radial direction(refer to an arrow) of a magnetic disk 153. Although the head 151 is pressed onto the surface of the magnetic disk 153 by the elastic force of a suspension 157, rotating the magnetic disk 153 causes aerodynamic flotation affecting to the head 151, so that a spacing between the head 151 and the surface of the magnetic disk 153 is controlled into tens of millimeter by the flotation. During its non-operated state, the head 151 climbs over a tapered portion 156 of the ramp 155 produced at one end of a body frame 150, and then rests on a retracting position thereof.

Figure 3:
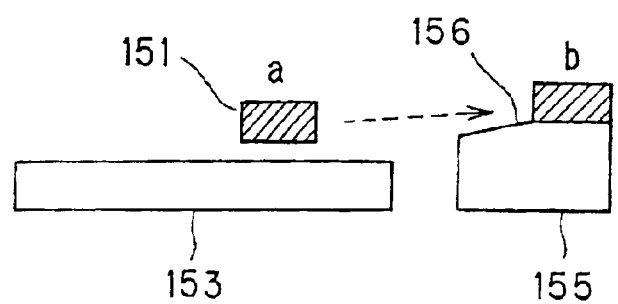
FIG. 3 is a sectional view showing the relationship between a head and a ramp of the hard disk.

FIG. 3 is a sectional view showing the positional relationship between the head 151 and the ramp 155. As shown in FIG. 3, the ramp 155 located near the periphery of the magnetic disk 153 is provided with the tapered portion 156 of which taper is formed so as to separate little by little from the disk surface of the magnetic disk 153 in an outward direction extending from the peripheral. The head 151 is located above the magnetic disk 153 with an appropriate spacing kept therebetween (position a) during its operated state, while the head 151 climbs over the tapered portion 156 so as to rest on the retracting position (position b), as shown by an arrow in FIG. 3, as soon as the operation state ends.

In the hard disk 15, there is formed a file management area 15*a* serving an area into which file management information for managing files stored already is written in an updateable fashion. The file management information includes information, such as file names stored in the hard disk 15 and recorded locations of those files therein.

The hard disk 15 has an area to store files of various data such as map data. Because the maximum memory of the hard disk 15 is fixed as a whole, there is a limitation to an amount of writable files. When used actually, the memory area of the hard disk 15 is made up of both of areas in which file data are written and the remaining areas which are empty.

In the present embodiment, when a new file is written into the hard disk 15, it is in principle written into an empty area of the hard disk 15. However, there are some cases where empty areas consist of a number of fragmentary areas arranged in a scattered form in the hard disk 15 and each fragmentary area is smaller in memory capacity than a file to be written. In such a case, the new file cannot be written in continuous areas of the hard disk 15. The data of the file are therefore divided into a plurality of data fragments and written in the hard disk 15 in a discontinuous arrangement form.

Where the data of a file are memorized in a discontinuously scattered form in the hard disk 15, a period of seek time to access the file is raised, thereby an access speed being lowered. Considering this drawback, the present embodiment adopts a defragmenting process, which is executed in the hard disk 15 where the data of a file is located in a scattered form. Executing the defragmenting process prevents the access speed from being lowered. Practically, locations of the data of a file is examined at predetermined timings. If the data are located in a scattered form, a plurality of data fragments that compose a file are transferred to a determined area, then located continuously therein. The defragmenting process according to the present invention will be detailed later.

Using FIG. 1, the description will be given again. The sensor unit 16 is provided with various types of sensors necessary to detect a current position of a vehicle. To be specific, the sensors include a speed sensor, distance sensor, and azimuth sensor all for detecting operating states of the vehicle. The sensor unit 16 also comprises an engine sensor 16*a* to detect whether the engine of the vehicle is operated or not.

The GPS receiver 17 receives electromagnetic waves emitted by GPS (Global Positioning System) satellites to output positional measurement data. Both sensor unit 16 and GPS receiver 17 serve as, together with the CPU 11, means for detecting a current position of the vehicle.

The interface 18 is responsible for interfacing operations between the sensor unit 16 and GPS receiver 17, and the CPU 11. Based on censored outputs from the sensor unit 16 and directional measurement data from the GPS receiver 17, the CPU 11 computes data of current positions. The CPU 11 then makes the current location data compare with the foregoing map data to correct them using processing such as a map matching process.

The operation unit 19, which functions as operating means, has a configuration in which a variety of keys and buttons used for desired operations necessary for the navigating operations. The operation unit 19 is placed on a not-shown navigation system main unit or outer remote control. When those keys and buttons being pushed down, corresponding sensing signals are provided to the CPU 11. The operation unit 19 has a defragmenting button 19*a*, which is pressed down when instructing the hard disk 15 to execute the defragmenting process. Alternatively, the defragmenting button 19*a* can be visualized on the display 20 as part of a display menu so as to be operated through an outer remote control or a touch panel.

The display 20, which is display means used for the navigation operations, is composed of, for example, a CRT or liquid crystal display device. Displayed on the display 20 are map data in a variety of modes according to control of the display control unit 21 and a car mark indicative of a current vehicle position superposed on the map. Additionally displayed on the display 20 is a section menu, which enables one to select execution of a defragmenting process or others executed in the hard disk 15.

The display control unit 21 produces data to be displayed on the display 20, the data being temporarily stored in the buffer memory 22. With this temporary storage under execution, the display control unit 21 reads out data to be displayed from the buffer memory 22 at appropriate timings, and sends them to the display 20 so as to be displayed thereon.

The voice processing circuit 23 generates electric voice signals indicative of voice massages under the control of the CPU 11. The voice signals that have been amplified up to an appropriate level are uttered from the speaker 24. The voice massages include an guidance message for guiding running routes of a vehicle, for example.

In the present embodiment, map data required for navigating operations are so designed that they are recorded in both DVD-ROM 1 and hard disk 15, or, only the hard disk 15. Map data may be stored in the hard disk 15 in advance. Alternatively, map data may be read out from the DVD-ROM 1 when needed, before they are transferred to the hard disk 15 for storage. Under execution of navigating operations, map data read out from either the DVD-ROM 1 or the hard disk 15 can be used. However, from the viewpoint of promoting a processing speed, it is more advantageous to use map data read out from the hard disk 15 of which access speed is faster.

Referring to FIGS. 4 to 9, the defragmenting process executed in the hard disk 15 will now be described. The present embodiment prepares for two situations; one for executing the defragmenting process responsively to user's operations, and the other for automatically executing the defragmenting process when a predetermined condition is fulfilled. In addition, there prepare for two situations in the present embodiment; one for recording map data into both of the DVD-ROM 1 and the hard disk 15, and the other for recording map data into the hard disk 15 alone.

Figure 4:
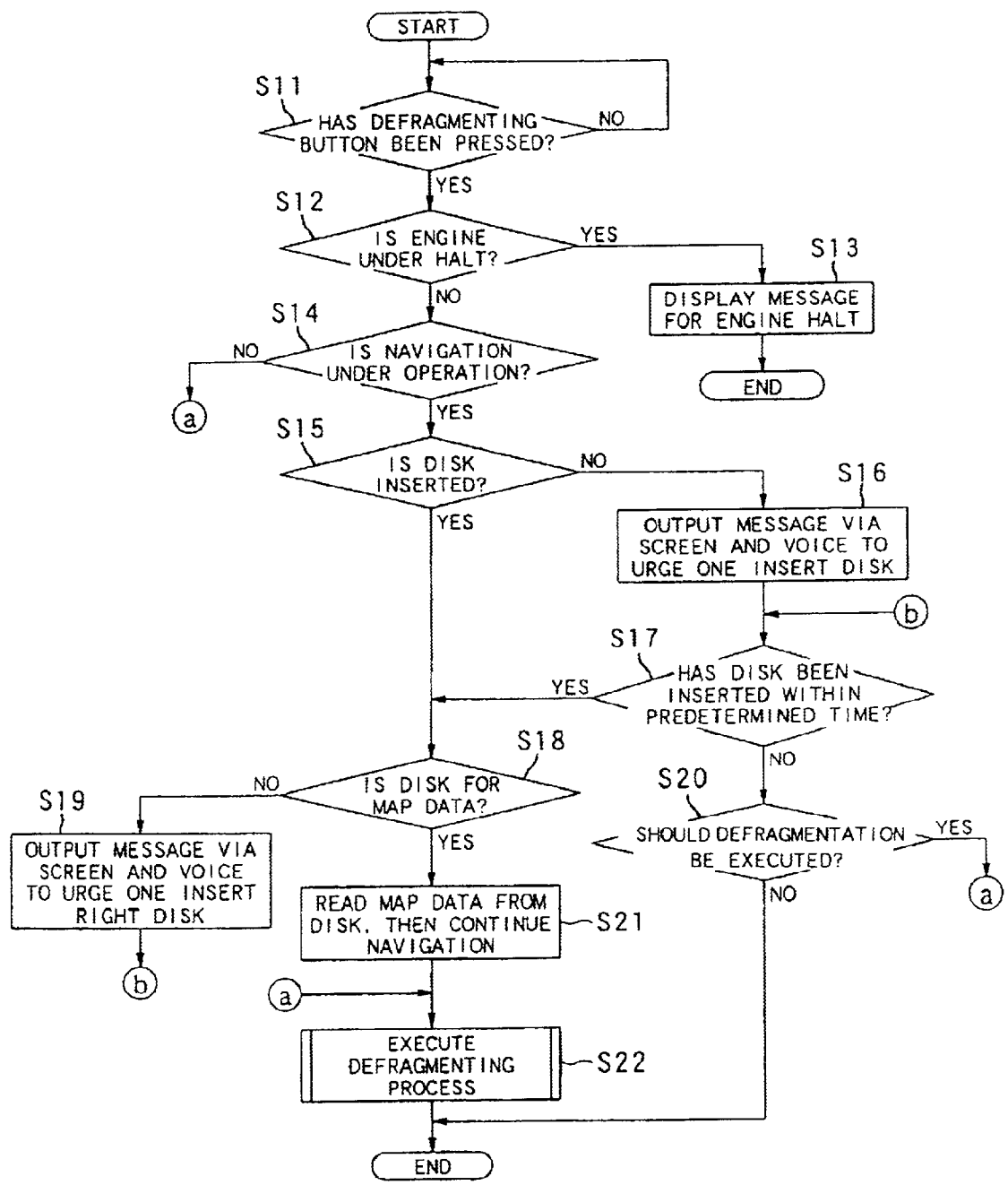
FIG. 4 is a flowchart indicating a first defragmenting process based on operations carried out by a user in the embodiment.

FIG. 4 shows one flowchart of the present embodiment, which corresponds to combined situations of the defragmenting process on the basis of user's operations and map data recorded into both of the DVD-ROM 1 and the hard disk 15. When the processing of FIG. 4 is started, a sensing signal from the operation unit 19 is monitored at Step S11 to determine whether the defragmenting button 19a is pressed down or not. If this determination reveals that the defragmenting button 19a has not been pressed down yet (NO at Step S11), the monitoring will be continued. In contrast, it is determined that the defragmenting button 19a has been pressed down (YES at Step S11), then being made to proceed to Step S12.

At Step S12, it is then determined whether the engine is under halt or not, based on a sensor output of the engine sensor 16a belonging to the sensor unit 16. This determination avoids the defragmenting process involving consumption of battery power from being executed during the halt of the engine. Instead, the halt of the engine may be determined by detecting whether or not an engine key switch is held at its ON position. If the determination at Step S12 shows that the engine is under halt (YES at Step S12), the processing proceeds to Step S13, where a massage informing a user of the engine stop is displayed on a screen of the display 20. The processing of FIG. 4 is then terminated.

However, at Step S12, when it is determined that the engine is under operation (NO at Step S12), the processing goes to Step S14, in which it is further determined if navigation is under operation or not. This determination causes navigating operations to be executed using map data read out from the DVD-ROM 1, because it is impossible to read out map data from the hard disk 15 during the defragmenting process. If the determination at Step S12 shows that it is not under navigation (NO at Step S14), the processing is made to go to Step S22, since the defragmenting process can be started immediately.

But when the determination at Step S14 shows that it is now under navigation (YES at Step S14), the processing proceeds to Step S15, where whether or not any disk is inserted in the DVD-ROM drive 14. When this determination at Step S15 represents that any disk has not been inserted in the DVD-ROM drive 14 (NO at Step S15), the processing is allowed to go to Step S16, while not so (YES at Step S15), the processing goes to Step S18.

At Step S16, a message to urge a user to insert a DVD-ROM 1 in which map data are recorded is not only provided on the screen of the display 20 but also uttered as a guidance voice from the speaker 24. For example, a message, such as "To continue the navigation, please insert a map disk into the disk player.", is used.

Then, at Step S17, it is determined if or not any disk has been inserted into the DVD-ROM drive 14 within a predetermined period of time. If the determination at Step S17 is that a disk has been inserted in the DVD-ROM drive 14 (YES at Step S17), the processing is handed to Step S18. By contrast, if any disk has not been inserted (NO at Step S17), the processing goes to Step S20. At Step S20, it is confirmed whether or not the defragmenting process should be executed. When the defragmenting process should be executed (YES at Step S20), the processing is forwarded to Step S22, while when the defragmenting process should not be executed (NO at Step S20), the processing of FIG. 4 is ended. Step S17 is set to confirm if the defragmenting process should be executed or not even if the navigation may be called off again, in cases a user has not inserted a disk when the defragmenting process is expected.

In contrast, at Step S18, whether or not the disk inserted at Step S15 or S17 is a DVD-ROM 1 for map data is determined. As a result, when the disk is not the DVD-ROM 1 for map data (NO at Step S18), the processing goes to Sep S19, where a message to urge the user to insert a right disk is displayed on the screen of the display 20 and uttered as a guidance voice from the speaker in the similar manner to Step S16.

When a result of determination at Step S18 is that an inserted disk is the DVD-ROM 1 (YES at Step S18), the processing is made to proceed to Step S21, in which the navigation is ordered to continue by reading out map data from the disk. Then, at Step S22, a defragmenting process of the hard disk 15 is executed, before ending the processing of FIG. 4.

Figure 5:
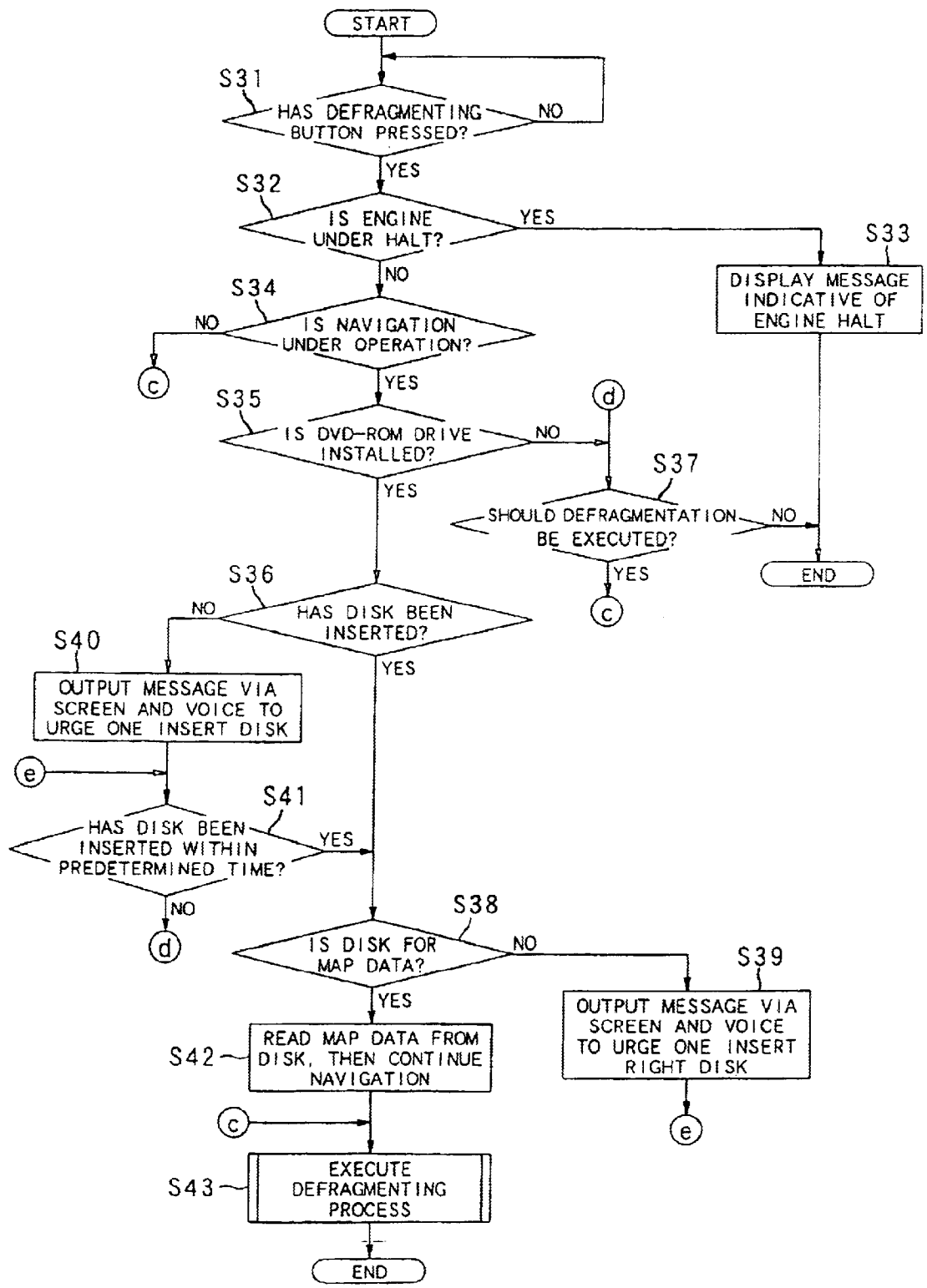
FIG. 5 is a flowchart indicating a second defragmenting process based on operations carried out by a user in the embodiment.

FIG. 5 is a flowchart showing a defragmenting process executed based on both a user's operation and map data recorded in only the hard disk 15. When the processing of FIG. 5 is started, the identical procedures to Steps S1 to S14 shown in FIG. 3 are carried out at Steps S31 to S34.

Then, at Step S35, it is determined if the DVD-ROM drive 14 is installed or not. This means that the flowchart shown in FIG. 5 is prepared for a navigation system in which the DVD-ROM drive 14 is detachably installed. When the determination at Step S35 indicates that the DVD-ROM drive 14 is installed (YES at Step S35), the processing proceeds to Step S36. In contrast, when the determination thereat shows that DVD-ROM drive 14 is not installed (NO at Step S35), the processing proceeds to Step S37.

At Step S36, whether or not any disk is inserted in the DVD-ROM drive 14 is determined. If the determination at Step S36 reveals that any disk is not inserted in the DVD-ROM drive 14 (NO at Step S36), the processing is made to go to Step S40. But, when a certain disk is inserted in the DVD-ROM drive 14 (YES at Step S36), the processing is made to go to Step S38.

At Step S40, a similar message to that at the foregoing step S16 is displayed on the screen of the display 20 and uttered as a guidance voice from the speaker 24. At succeeding Step S41, determined is whether or not any disk is inserted into the DVD-ROM drive 14 within a predetermined period of time. When determined is that a certain disk is inserted (YES at Step S41), the processing proceeds to Step S38, while when the fact that any disk is not inserted is found (NO at Step S41), the processing is then carried out at Step S37.

At Step S37 routed from Step S35, determined is whether or not the defragmenting process should be executed, which is a confirmation process executed in the similar manner to that at Step S20 described before. When executing the defragmenting process (YES at Step S37), the processing goes to Step S43. In contrast, where the defragmenting process will be not executed (NO at Step S37), the processing of FIG. 4 is terminated.

Then at Step S38, it is determined if or not the disk found to be inserted at Step S36 or S41 is the DVD-ROM 1 for map data. When it is not determined that the disk is the DVD-ROM 1 for map data (NO at Step S38), the processing is made to go to Step S39, where a massage is outputted in the similar manner to that at Step S19 described before. But, when the determination is made at Step S38 such that the inserted disk is the DVD-ROM 1 for map data (YES at Step S38), the processing is made to go to Step S42, at which map data are read from the disk to continue the navigation.

Subsequently, at Step S43, a defragmenting process of the hard disk 15 is executed in the similar way to that at foregoing Step S22, before ending the processing of FIG. 5.

Figure 6:
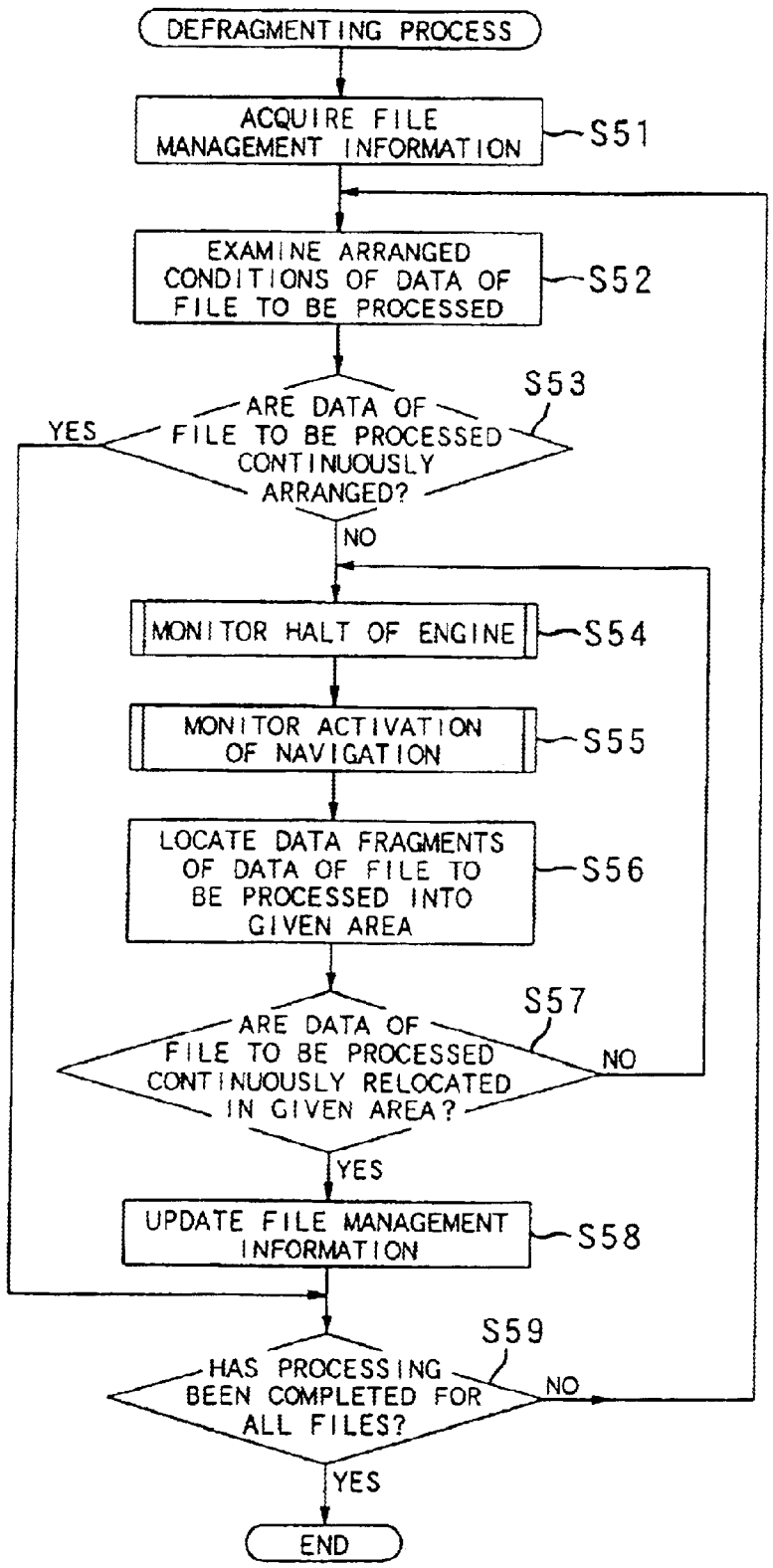
FIG. 6 is a flowchart illustrating details of each defragmenting process according to the embodiment.

FIG. 6 details a flowchart showing the defragmenting process executed at Steps S22 and S43. Responsively to the start of the processing of FIG. 6, the processing is first executed at Step S51, where the hard disk 15 is accessed to acquire file management information from the file managing area 15a thereof. This information makes it possible to confirm a preserved condition of each file in the hard disk 15.

Then at Step S52, a single file selected in turn from the stored files in the hard disk 15 is examined with respect to its data arrangement condition in the hard disk 15 on the basis of the file management information acquired at Step S51. This examination makes it possible to find a recorded position of each of a plurality of data fragments which belong to the same file to be examined.

At Step S53, based on the results of the determination at Step S52, it is further determined if or not the data of the examined file are arranged continuously on the disk 153 of the hard disk 15. If a result of the determination is that the data of the examined file are continuously arranged without being divided into data fragments (YES at Step S53), the defragmentation of this file is not necessary, skipping to Step S59. By contrast, the determination reveals that the data of the examined file are discontinuously arranged with a divided condition into a plurality of data fragments (NO at Step S53), the processing is made to proceed to Step S54.

Steps S54 and S55 are prepared for monitoring a state where the defragmenting process might be discontinued. A stop of the engine is monitored at Step S54, while an activation of navigation is monitored at Step S55. These two types of processing will be described below with reference to FIGS. 7 and 8.

Figure 7:
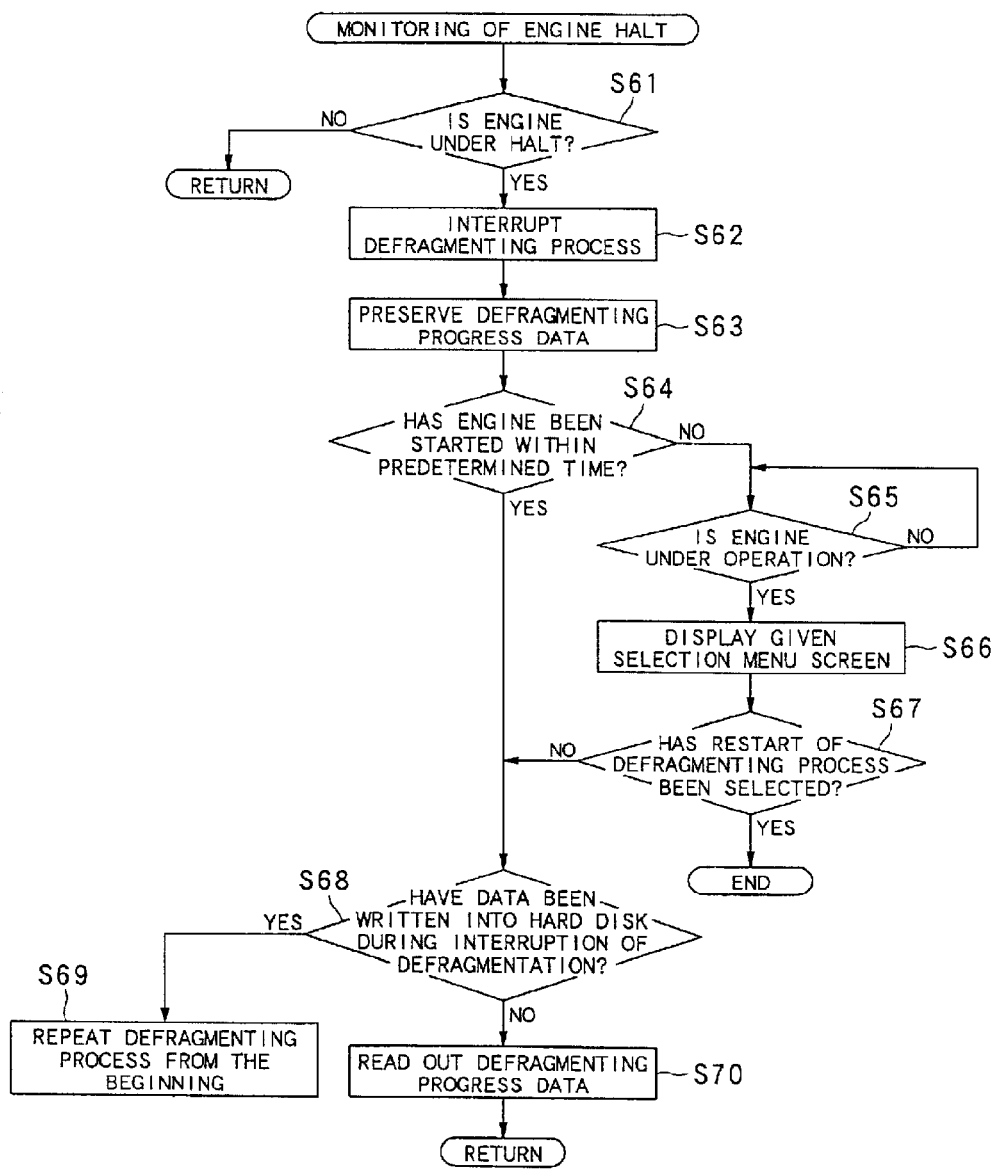
FIG. 7 is a flowchart explaining a monitoring process of the halt of an engine, which is executed in the defragmenting process of the embodiment.

FIG. 7 shows a practical monitoring process for the halt or operation of an engine at Step S54 in FIG. 6. At Step S61 in FIG. 7, based on a sensing output from the engine sensor 16a installed in the sensor unit 16, it is determined whether the engine is under halt or not. If it is determined that the engine is under operation (NO at Step S61), the processing is made to go back to Step S55 in FIG. 6, because there is no problem in continuing the defragmenting process.

On the contrary, when it is determined at Step S61 that the engine is under halt (YES at Step S61), the defragmenting process is interrupted at Step S62 in order to save the consumption of the battery power. Then at Step S63, defragmentation progress data that indicates progress conditions of the defragmenting process are preserved into a given area of the hard disk 15. As will be described later, the defragmentation progress data are used to specify both of files that were already processed and data fragments that were already relocated through the defragmenting process, in cases the defragmenting process that has been interrupted is restarted.

Then, at Step S64, it is determined if or not the engine has been restarted within a given period of time in the similar manner to that at Step S61. As a result, in the case that the engine is still under halt (NO at Step S64), the processing is made to go to Step S65. But when the engine has been restarted (YES at Step S64), the processing at Step S68. At Step S65, using a sensing output from the engine sensor 16a, the determination of whether the engine has been started or not is made. As long as the engine continues stopping its operation, the determination at Step S65 is repeated (NO at Step S65). When the engine has been started (YES at Step S65), the processing then proceeds to Step S66.

At Step S66, a selection menu for allowing a user to select either the restart or interruption of the defragmenting process is displayed on the display 20. That is, this selection is placed to decide, according to user's desire, the pros and cons of restart of the defragmenting process that has been interrupted. For instance, a message such as "The defragmentation has been interrupted. Do you restart the defragmentation." and a selection button for executing the defragmentation are displayed.

At succeeding Step S67, on the basis of the results of user's selection carried out toward the selection menu displayed by the process at Step S66, it is determined whether or not restarting the defragmenting process has been selected. As a result of it, when the interruption of the defragmenting process has been selected (NO at Step S67), the processing of FIG. 7 ends. By contrast, when a restart of the defragmenting process has been selected (YES at Step S67), the processing goes to the next step S68.

At Step S68, determined is whether or not the hard disk has been accessed and new data have been written after the interruption of the defragmenting process at Step S62. This determination is placed, because it is necessary to avoid the defragmenting process from being restarted, in cases new data have been written in the hard disk 15. For instance, if a flag indicating writing into the hard disk 15 is added to the foregoing defragmentation progress data, the determination at Step S68 is possible.

When the determination at Step S68 shows that data have been written into the hard disk 15 (YES at Step S68), the defragmenting process is repeated from the beginning at Step S69. That is, the steps shown in FIG. 6 are processed again.

On the contrary, when the determination at Step S68 shows that data have not been written into the hard disk 15 (NO at Step S68), the defragmentation progress date are read out at Step S70. Then, the processing is made go back to Step S55 in FIG. 6 to continue the defragmenting process.

Figure 8:
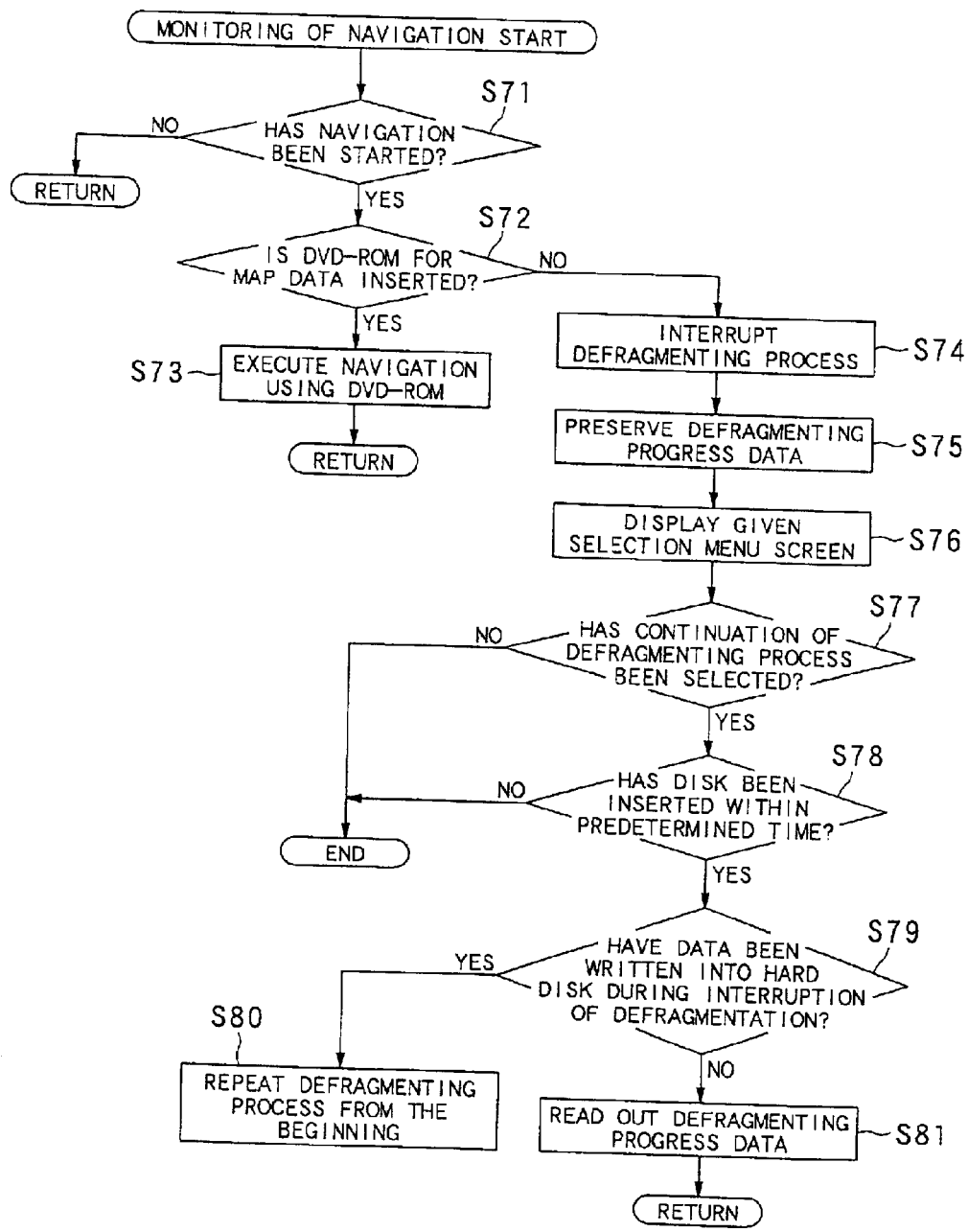
FIG. 8 is a flowchart explaining a monitoring process of activation of navigation, which is executed in the defragmenting process of the embodiment.

Next described is a flowchart of FIG. 8 showing a practical process for monitoring the start of navigation carried out at Step S55 in FIG. 6. At Step S71 of FIG. 8, whether navigation has been started or not is determined. As an example, when a user operates the operation unit 19 to order the start of navigation, the navigation is launched. If the determination at Step S71 reveals that the navigation has not been started (NO at Step S71), the processing goes back to Step S56 of FIG. 6, because there is no inconvenience if the defragmenting process is continued.

But, if a result of the determination at Step S71 is that the navigation has already been started (YES at Step S71), Steps S72 to S81 undergo processing successively, in which the processing takes the access to the hard disk 15 into account. First, at Step S72, it is determined if or not the DVD-ROM 1 for map data is inserted into the DVD-ROM drive 14. When the DVD-ROM drive 14 is inserted with the DVD-ROM 1 (YES at Step S72), the processing is handed to Step S73, whilst when the DVD-ROM 1 is not inserted (NO at Step S72), the processing goes to Step S74.

At Step S73, navigation is made using map data memorized on the DVD-ROM 1 inserted in the DVD-ROM drive 14. This enables the navigation to be executed, while still averting accesses to the hard disk 15 under defragmentation are averted. Then, the processing is went back to Step S56 of FIG. 6.

At Step S74, however, the defragmenting process is interrupted in order to avert accesses to the hard disk 15 under defragmentation. Then, at Step S75, the foregoing defragmentation progress data are preserved in a given area in the hard disk 15.

Then, at Step S76, a selection menu for allowing a user to select whether or not the defragmenting process should be continued or cancelled is displayed on the display 20. For instance, a message such as "A navigating disk is required to continue the defragmentation. Will you insert a disk to continue the defragmentation?" and a selection button for executing the defragmentation are displayed.

Then, at Step S77, on the basis of user's selection results on the selection menu displayed at the process of Step S76, it is determined whether or not to continue the defragmenting process has been selected. As a result, when the cancellation of the defragmenting process has been selected (NO at Step S77), the processing of FIG. 8 is ended. In contrast, when the defragmentation process is selected to be continued (YES at Step S77), the processing proceeds to Step S78.

At Step S78, it is then determined whether or not any disk necessary for navigation has been inserted into the DVD-ROM drive 14 within a predetermined period of time according to instructions on the selection menu displayed at the process of Step S76. If the determination shows that a disk is inserted in the DVD-ROM drive 14 (YES at Step S78), Step S79 is processed next. But in the case that a proper disk is not inserted (NO at Step S78), the processing of FIG. 8 is terminated.

At Step S79, determined is whether or not after the interruption of the defragmenting process at Step S74, accesses have been made to the hard disk 15 to write new data. This determination can be conducted in the similar manner to that at Step S68.

In cases the determination at Step S79 represents that writing new data into the hard disk 15 has been made (YES at Step S79), Step S80 is next processed. However, when no new data have been written into the hard disk 15 (NO at Step S79), Step SS1 is next processed. The processing at both Steps S80 and S81 is executed in the similar way to that at Steps S69 and S70 described before.

Returning to FIG. 6, at Step S56, in the hard disk 15, the data fragments composing the data of a file to be processed are relocated into a given area of the disk 153. The given area into which the data of a file to be processed are relocated should be a continuous empty area larger in memory size than, at least, a file size of a file to be processed.

Then, at Step S57, it is determined whether or not the data fragments composing the data of a file to be processed have been continuously arranged in the given area in the hard disk 15. Repeatedly executing the processing at Step S56 by the number of the data fragments of the data of a file to be processed permits the file to be processed to be relocated, as a whole, into the given area, thus being continuously arranged therein. Where the determination at Step S57 represents that the data of the file to be processed are still scattered into data fragments (NO at Step S57), the processing is returned to Step S54 to repeat the same processing.

In contrast, in cases all the data fragments of the file to be processed have been relocated so that they are continuously arranged in the given area in the hard disk 15 (YES at Step S57), the processing is then carried out at Step 58, in which the file management information in the file management area 15*a* is updated. In other words, based on new arrangements of the file that has been processed, the file management information is corrected, before the corrected ones are written into the file management are 15*a*.

Subsequently from Step S53 or S58, the processing is executed at Step S59, where it is determined if all the files that had been stored in the hard disk 15 have underwent the processing shown at Steps 52 to S58 or not. In cases one or more file is still remained unprocessed (NO at Step S59), the processing is returned to Step S52. As soon as the processing of all the files has been completed, the defragmenting process is terminated.

As described above, executing the processing according to FIGS. 4 to 8 enables the defragmenting process in the hard disk 15 based on user's operations. In consequence, the hard disk 15 can be tidied up its memory are on the disk 153, thus maintaining a high access speed. Additionally, after the defragmenting process is once started, various kinds of conditions including conditions of navigation, running situations of a vehicle, accesses to the hard disk 15 are examined to control the interruption and continuation of the defragmenting process. It is therefore possible to properly perform the defragmenting process without enforcing complicated judgement on a user, thereby realizing the defragmenting process with higher reliability and efficiency.

Figure 9:
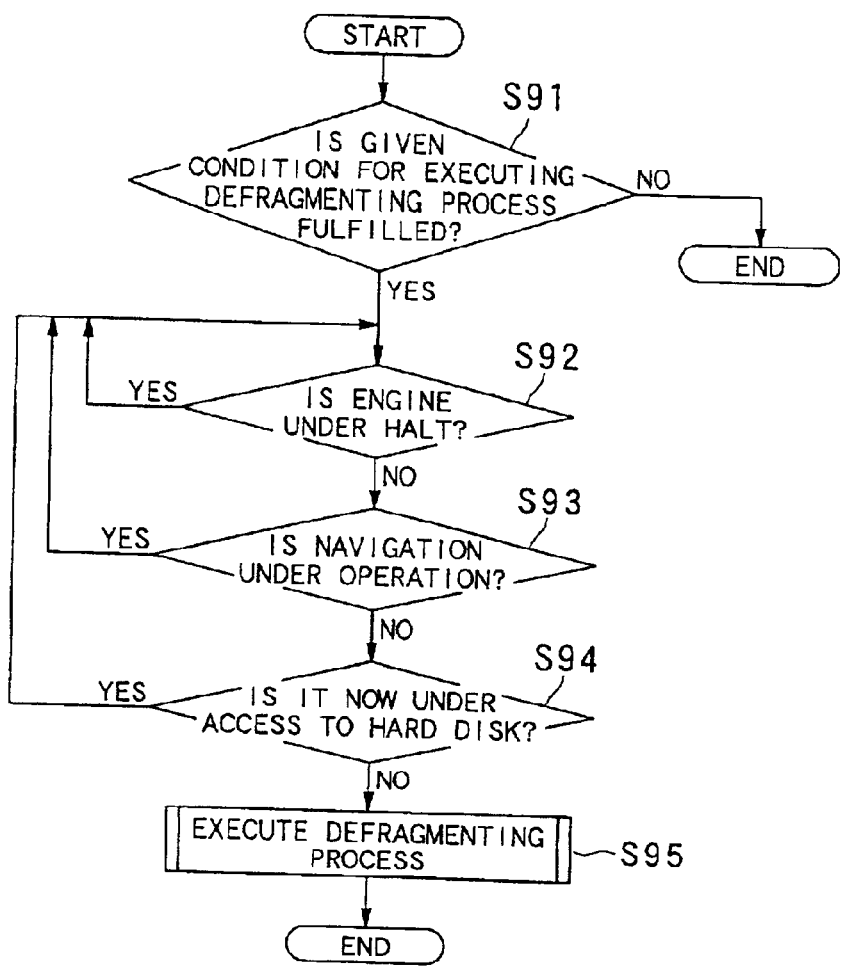
FIG. 9 is a flowchart showing a defragmenting process automatically executed under a predetermined condition in the embodiment.

Referring to a flowchart in FIG. 9, a defragmenting process executed in an automatic manner under a predetermined condition will now be described. When the processing of FIG. 9 is started, it is first determined at Step S91 if or not a predetermined condition set for executing the defragmenting process is fulfilled. By way of example, the predetermined condition is a period of time that has passed since the execution of the last defragmenting process.

In cases the determination at Step S91 shows that the condition for execution of the defragmenting process is not fulfilled (NO at Step S91), the processing of FIG. 9 is ended. However, in the case of fulfilling the condition for the execution (YES at Step S91), the processing is made to go to Step S92.

At Step S92, determined is whether the engine is under halt or not. This determination may be performed in the similar manner to that at Step S12. When the determination at Step S92 shows that the engine is under halt (YES at Step S92), the processing will wait for until the start of the engine. In contrast, if the engine has already been put into operation (NO at Step S92), the processing proceeds to Step S93.

At Step S93, whether or not a navigating operation is under performance is determined. This determination is placed to consider the fact that there is a possibility of accesses which might be made to the hard disk 15 in order to read map data in navigation. Where the determination at Step S93 shows that it is now under navigation (YES at Step S93), the processing is returned to Step S92 to repeat the same process. By contrast, the determination that it is not under navigation comes out (NO at Step S93) makes the processing proceed to Step S94.

At Step S94, whether or not it is now under access to the hard disk 15 is determined. This determination is set to avoid the defragmenting process from being started under a condition that various data are read or written from or into the hard disk 15 during a period of non-operation of the navigation. When the determination at Step S94 reveals that it is under access to the hard disk 15 at present (YES at Step S94), the processing is returned to Step S92 to repeat the same process. On the contrary, when it is not under access to the hard disk 15 (NO at Step S94), Step S95 is processed, where the defragmenting process shown in FIG. 6 is executed, before terminating the processing of FIG. 9.

By way of another example, the defragmenting process described with FIG. 9 may be configured in such a manner that it is executed in consideration of operated states of a vehicle. Practically, the defragmenting process is prohibited during a operating state of a vehicle, while the defragmenting process is executed if the vehicle is stopped (but its engine is under operation). Thus, the defragmenting process can be executed at a timing when it is unnecessary to read out new map data from the hard disk 15.

In addition, it may be configured so that the defragmenting process shown in FIGS. 4 to 8 so as to response to pressing down the defragmenting button 19a and the defragmenting process shown in FIG. 9 so as to be executed automatically are switchable responsively to user's operations.

Moreover, it may be configured in a such manner that data arrangement involving with the defragmenting process carried out in the hard disk 15 is dependent on the type of a file to be processed. Specifically, data in the defragmenting process can be relocated in the hard disk 15 in different manners, depending on the type of file, such as a map data file, sound data file, or location data file. By way of example, a configuration is considered, where map data, which are frequently accessed, are relocated in an outer circumferential area of the disk, which is faster in access speed; in contrast, location data, which are not so frequently accessed, are relocated in an inner circumferential area of the disk, which is relatively slower in access speed. The reason is that in FIG. 2, the retracting position of the head 151 of the hard disk 15 is located near to the peripheral of the disk. Thus, the head 151 is able to read and write information from and into the outer circumferential area of the disk more quickly than the inner one thereof. On the contrary, where the retracting position of the head 151 is located near to an inner circumferential area of the disk, the foregoing relationships between the type of data and relocations thereof become opposite.

To judge the type of a file to be processed, one technique is to attach an extension inherent to the type of a file. For instance, exemplified are an extension "map" to a file of map data, extension "snd" to a file of sound data, and extension "loc" to a file of location data. Alternatively, an access frequency may be counted for each file to be processed, each frequency is made reference to weight each file, and then each file weighted with corresponding frequency is processed by the defragmentation.

Changing how to relocate data into the hard disk 15 according to the types of files to be processed and access frequencies thereto is also effective in retracting the hard disk 15 in accordance with the types of files to be processed and access frequencies thereto. Specifically, the hard disk 15 has a function called "emergency unloading." This emergency unloading function is an operation to forcibly return the head 151 to its retracting position in case that both power supplies for the motors driving both of the spindle 152 and the head 151 (refer to FIG. 2) are broken down, so that the magnetic disk 153 is prevented from being damaged by the head 151. Power is required to make the emergency unloading function to be activated. It can therefore be configured such that a counter electromotive force induced by the inertial rotation of the spindle motor generated when the power supplies are broken down is used to operate the emergency unloading function.

In cases where the hard disk 15 is applied to a system mounted on a vehicle as seen in the present embodiment, there is a higher possibility that the foregoing emergency unloading occurs every time of start of an engine, because instantaneous interruptions are easier to occur in such an case of engine start or others. As described above, the emergency unloading operates to forcibly move the head 151 by utilizing a counter electromotive force generated at the spindle motor, thus no control of velocity of the header 151 being available. Therefore, opportunities of causing the head 151 to collide with the tapered portion 156 of the ramp 155 during the retraction of the header to its waiting position. The farther the head 151 from the waiting position, the higher a degree of shock at the collision.

Accordingly, frequently accessed data are relocated in an outer circumferential area of the disk 153 of the hard disk 15 in executing the defragmenting process, which eases the shock when a retracting operation of the head occurs. It is preferable to consider such a feature when employing the defragmenting process of the present embodiment.

The processing of FIG. 9 described above can avoid user's operations of the operation unit 19, so the defragmenting process is executed in an automatic fashion. A user is free from complicated operations and being conscious of the defragmenting process. Additionally, the defragmenting process is executed, as various conditions, such as situations of navigation, operated states of a vehicle, accesses to the hard disk 15, are examined. As a result, the defragmenting process with higher reliability and efficiency can be realized.

Moreover, in the foregoing embodiment, a recording medium into which map data are recorded has been described as being the DVD-ROM 1. With respect to this recording medium, its recording format is not confined to a DVD format. In addition, the recording medium is not limited to an optical disk or others. For example, the present invention can be applied to a system in which map data are transmitted through a network and down-loaded. The present invention is also applied to a configuration where the hard disk 15 is incorporated alone, and reading means such as the DVD-ROM drive 14 is not incorporated.

Further, the navigation system of the present invention is not limited to being built as an individual navigation apparatus. By way of example, the navigation system can be provided as a combination with a personal computer having a hard disk. In this configuration, by operating the software to execute the transfer processing of the present invention in the personal computer, the functions described in the foregoing embodiment can be obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-99905 filed on Mar. 31, 2000 including the specification, claims, drawings and summary is incorporated herein by reference in its entirety.

What is claimed is:

1. A navigation operation system performing navigation based on a detected current position and map data, the navigation system comprising:

a storage device, which is nonvolatile, from and into which files of map data are to be read and written;

a navigation control device for controlling the navigation operation using the map data;

a head for reading and writing information from and into the storage device;

a providing device for providing a position to which the head is made to retract from a portion on the storage device; and a defragmenting processing device for performing a defragmenting processing with the storage device at a predetermined time, wherein the defragmenting processing device continuously arranges specific data in the vicinity of the retracted position when the defragmenting processing is performed.

2. The navigation system according to claim 1, wherein the defragmenting processing device continuously arranges a plurality of data fragments being arranged in a divided form and belonging to the same file.

3. The navigation system according to claim 1, wherein the storage device is a hard disk mounted in a hard disk apparatus.

4. The navigation system according to claim 1, further comprising an operation device with which executing the defragmenting processing in the storage device is able to be ordered, wherein the defragmenting processing device performs the defragmenting processing in response to the instruction of execution from the operation device.

5. The navigation system according to claim 1, wherein the defragmenting processing device interrupts the defragmenting processing if a given condition is fulfilled during executing the defragmenting processing.

6. The navigation system according to claim 5, wherein the defragmenting processing device preserves defragmenting progress data indicative of a progress condition of the defragmenting processing if the defragmenting processing under performance is interrupted.

7. The navigation system according to claim 1, wherein the defragmenting processing device is constructed so as to execute the defragmenting processing in cases a vehicle on which the navigation system is mounted is stopped.

8. A navigation operation system performing navigation based on a detected current position and map data, the navigation system comprising:

a storage device, which is nonvolatile, from and into which files of map data are to be read and written;

a navigation control device for controlling the navigation operation using the map data; and a defragmenting processing device for performing a defragmenting processing with the storage device at a predetermined time, wherein the defragmenting processing device interrupts the defragmenting processing if a given condition is fulfilled during executing the defragmenting processing, wherein the defragmenting processing device preserves defragmenting progress data indicative of a progress condition of the defragmenting processing if the defragmenting processing under performance is interrupted, and wherein the navigation system further comprises an engine sensor for detecting an operated state of an engine of a vehicle, wherein the defragmenting processing device not only monitors an output of the engine sensor during executing the defragmenting processing but also interrupts the defragmenting processing in response to a stop of the engine.

9. The navigation system according to claim 8, wherein the defragmenting processing device restarts the defragmenting processing based on the defragment progress data when the engine under halt is started after the defragmenting processing was interrupted.

10. A navigation operation system performing navigation based on a detected current position and map data, the navigation system comprising:

a storage device, which is nonvolatile, from and into which files of map data are to be read and written;

a navigation control device for controlling the navigation operation using the map data; and a defragmenting processing device for performing a defragmenting processing with the storage device at a predetermined time, wherein the defragmenting processing device interrupts the defragmenting processing if a given condition is fulfilled during executing the defragmenting processing, wherein the defragmenting processing device preserves defragmenting progress data indicative of a progress condition of the defragmenting processing if the defragmenting processing under performance is interrupted, and wherein the defragmenting processing device interrupts the defragmenting processing when the navigation is activated during execution of the defragmenting processing.

11. A navigation operation system performing navigation based on a detected current position and map data, the navigation system comprising:

a storage device, which is nonvolatile, from and into which files of map data are to be read and written;

a navigation control device for controlling the navigation operation using the map data;

a defragmenting processing device for performing a defragmenting processing with the storage device at a predetermined time;

an operation device with which executing the defragmenting processing in the storage device is able to be ordered, wherein the defragmenting processing device performs the defragmenting processing in response to the instruction of execution from the operation device; and a readout device for reading out the map data from a recording medium in which the map data are recorded, wherein the navigation control device executes a navigating operation based on the map data read out by the readout device when the navigation is under operation based on the map data stored in the storage device at a time when the execution of the defragmenting processing is ordered by the operation device, and the defragmenting processing device executes the defragmenting processing in the recording medium.

12. A navigation operation system performing navigation based on a detected current position and map data, the navigation system comprising:

a storage device, which is nonvolatile, from and into which files of map data are to be read and written;

a navigation control device for controlling the navigation operation using the map data;

a defragmenting processing device for performing a defragmenting processing with the storage device at a predetermined time;

an operation device with which executing the defragmenting processing in the storage device is able to be ordered, wherein the defragmenting processing device performs the defragmenting processing in response to the instruction of execution from the operation device;

a readout device for reading out the map data from a recording medium in which the map data are recorded; and an ordering device for ordering execution of a navigating operation, wherein the navigation control device executes the navigating operation based on the map data read out by the readout device when activation of the navigating operation is ordered by the ordering device during the defragmenting processing in the storage device by the defragmenting processing device.

13. A navigation operation system performing navigation based on a detected current position and map data, the navigation system comprising:

a storage device, which is nonvolatile, from and into which files of map data are to be read and written;

a navigation control device for controlling the navigation operation using the map data;

a defragmenting processing device for performing a defragmenting processing with the storage device at a predetermined time, an operation device with which executing the defragmenting processing in the storage device is able to be ordered, wherein the defragmenting processing device performs the defragmenting processing in response to the instruction of execution from the operation device;

a readout device for reading out the map data from a recording medium in which the map data are recorded; and an ordering device for ordering execution of a navigating operation, wherein the defragmenting processing device interrupts a defragmenting operation when the recording medium is unloaded in the readout device as well as activation of the navigating operation is ordered by the ordering device during the defragmenting processing in the storage device by the defragmenting processing device.

14. The navigation system according to claim 13, wherein the navigation control device issues a message, after the interruption of the defragmenting processing, for urging a user to load the recording medium in which necessary map data are recorded, and the defragmenting processing device restarts the defragmenting processing based on the defragmenting progress data at a time when the recording medium is loaded.

15. The navigation system according to claim 9 or 14, further comprising a selective inputting device for enabling a user to selectively input information about either one of the restart and discontinuation of the defragmenting processing, prior to the restart of the interrupted defragmenting processing.

16. A navigation apparatus performing a navigation operation based on a current position and map data, the navigation apparatus comprising:

a recording medium which stores the map data, a head for reading and writing information from and into the recording medium;

a providing device for providing a position to which the head is made to retract from a portion on the recording medium; and a controller which controls the navigation operation based on the map data, wherein the controller performs a defragment operation for the recording medium at a first predetermined condition and stops the defragment operation at a second predetermined condition, and wherein the defragment operation continuously arranges specific data in the vicinity of the retracted position.

17. A new navigation apparatus according to claim 16, wherein audio data is to be stored in the recording medium.

18. A navigation apparatus according to claim 16, wherein the first predetermined condition is a condition of no navigation operation.

19. A navigation apparatus according to claim 16, wherein the first predetermined condition is a condition that a user instructs the defragment operation.

20. A navigation apparatus according to claim 16, wherein the second predetermined condition is a condition that the defragment operation is completed.

21. A navigation apparatus according to claim 16, wherein the second predetermined condition is a condition of an engine stop of a vehicle in which the navigation apparatus is installed.

22. A navigation method performing a navigation operation based on a current position and map data, the navigation method comprising:

performing the navigation operation based on the map data stored in a recording medium, providing a position to which a head, which reads and writes information from and into the recording medium, is made to retract from a portion on the recording medium, performing a defragment operation at a first predetermined condition, and stopping the defragment operation at a second predetermined condition, wherein the defragment operation continuously arranges specific data in the vicinity of the retracted position.

23. A navigation method according to claim 22, wherein audio data is to be stored in the recording medium.

24. A navigation method according to claim 22, wherein the first predetermined condition is a condition of no navigation operation.

25. A navigation method according to claim 22, wherein the first predetermined condition is a condition that a user instructs the defragment operation.

26. A navigation method according to claim 22, wherein the second predetermined condition is a condition that the defragment operation is completed.

27. A navigation method according to claim 22, wherein the second predetermined condition is a condition of an engine-stop of a vehicle in which the navigation apparatus is installed.

28. A navigation system operation performing navigation based on a detected current position and map data, the navigation system comprising:

a storage device, which is nonvolatile, from and into which files of man data are to be read and written;

a navigation control device for controlling the navigation operation using the map data; and a defragmenting processing device for performing a defragmenting processing with the storage device at predetermined time, wherein the storage device is a hard disk mounted in a hard disk apparatus which comprises:

a head for reading and writing information from and into the hard disk; and a providing device for providing a position to which the head is made to retract from a portion on the hard disk, and the defragmenting processing device preserves defragmenting progress data indicative of a progress condition of the defragmenting processing if the defragmenting processing under performance is interrupted, and continuously arranges specific data in the vicinity of the retracted position when defragmenting processing is performed.

29. A navigation system operation performing navigation based on a detected current position and map data, the navigation system comprising:
 a storage device, which is nonvolatile, from and into which files of map data are to be read and written;
 a navigation control device for controlling the navigation operation using the map data;
 a defragmenting processing device for performing a defragmenting processing with the storage device at predetermined time; and
 an operation device with which executing the defragmenting processing in the storage device is able to be ordered, wherein the defragmenting processing device performs the defragmenting processing in response to the instruction of execution from the operation device; and
 wherein the defragmenting processing device preserves defragmenting process data indicative of a progress condition of the defragmenting processing if the defragmenting processing under performance is interrupted.

30. A navigation apparatus performing a navigation operation based on a current position and map data, the navigation apparatus comprising:
 a recording medium which stores the map data, and
 a controller which controls the navigation operation based on the map data,
 wherein the controller performs a defragment operation for the recording medium at a first predetermined condition and stops the defragment operation at a second predetermined condition, and
 wherein defragmenting progress data indicative of a progress condition of the defragment operation is preserved if the defragmenting operation under performance is interrupted.

31. A navigation apparatus according to claim 30, wherein audio data is to be stored in the recording medium.

32. A navigation apparatus according to claim 30, wherein the first predetermined condition is a condition of no navigation operation.

33. A navigation apparatus according to claim 30, wherein the first predetermined condition is a condition that a user instructs the defragment operation.

34. A navigation apparatus according to claim 30, wherein the second predetermined condition is a condition that the defragment operation is completed.

35. A navigation apparatus according to claim 30, wherein the second predetermined condition is a condition of an engine stop of a vehicle in which the navigation apparatus is installed.

36. A navigation method performing a navigation operation based on a current position and map data, the navigation method comprising:
 performing the navigation operation based on the map data stored in a recording medium,
 performing a defragment operation at a first predetermined condition,
 stopping the defragment operation at a second predetermined condition, and
 preserving defragmenting progress data indicative of a progress condition of the defragmenting operation if the defragment operation under performance is interrupted.

37. A navigation method according to claim 36, wherein audio data is to be stored in the recording medium.

38. A navigation method according to claim 36, wherein the first predetermined condition is a condition of no navigation operation.

39. A navigation method according to claim 36, wherein the first predetermined condition is a condition that a user instructs the defragment operation.

40. A navigation method according to claim 36, wherein the second predetermined condition is a condition that the defragment operation is completed.

41. A navigation method according to claim 36, wherein the second predetermined condition is a condition of an engine-stop of a vehicle in which the navigation apparatus is installed.

* * * * *